Jan. 27, 1931.    J. J. M. ELIAS    1,790,204
MOTOR DRIVEN MACHINE FOR HARVESTING SUGAR CANE
Filed July 12, 1928    3 Sheets-Sheet 1
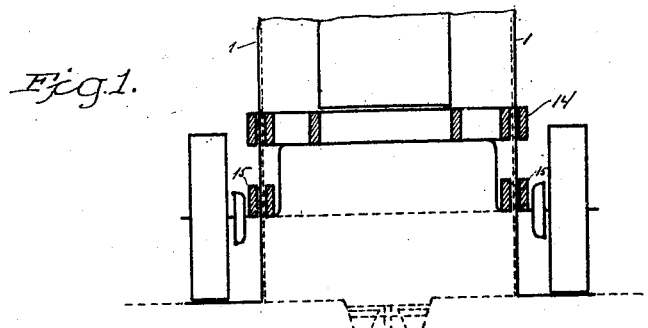
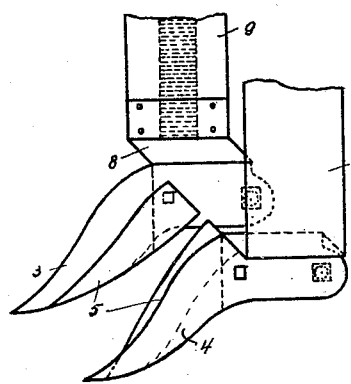
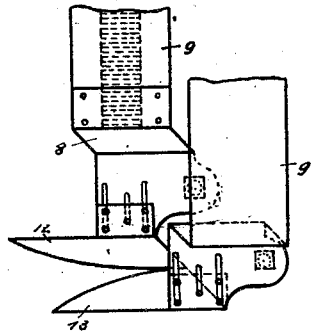
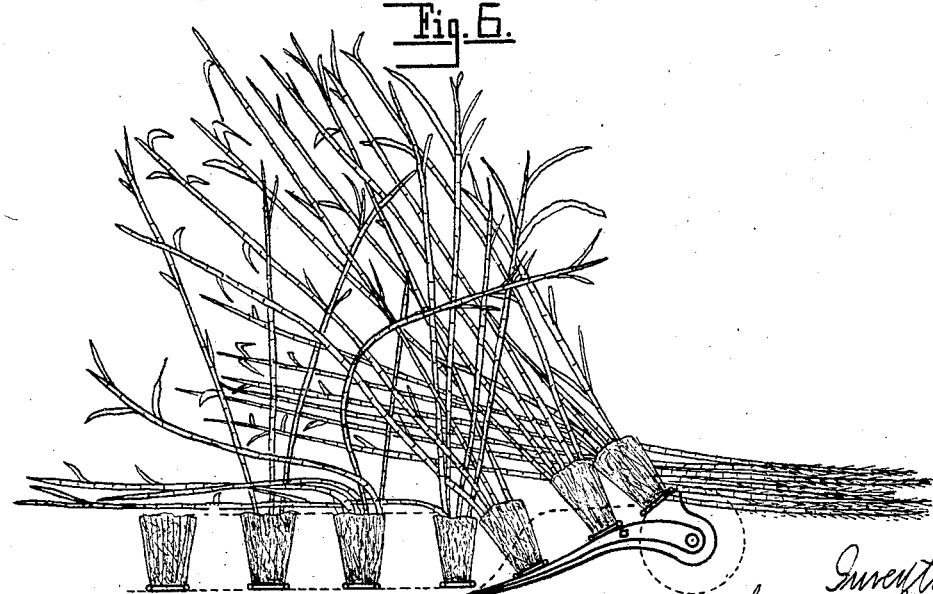

Jan. 27, 1931.  J. J. M. ELIAS  1,790,204
MOTOR DRIVEN MACHINE FOR HARVESTING SUGAR CANE
Filed July 12, 1928  3 Sheets-Sheet 2

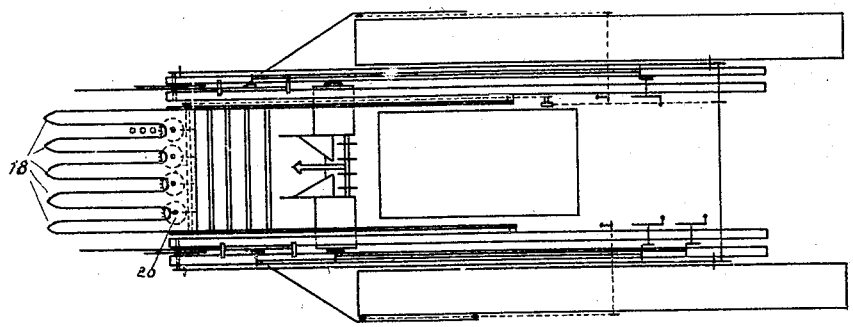
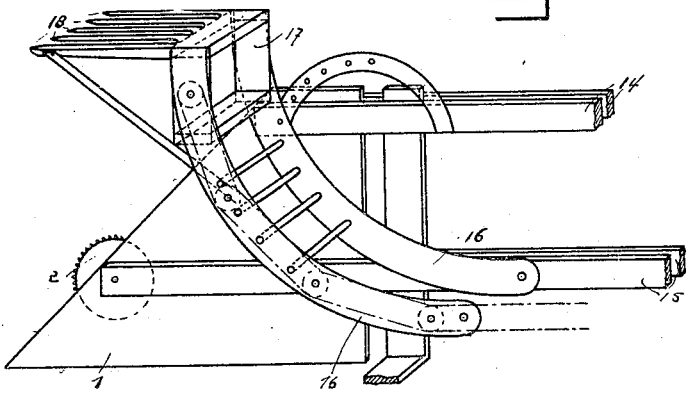
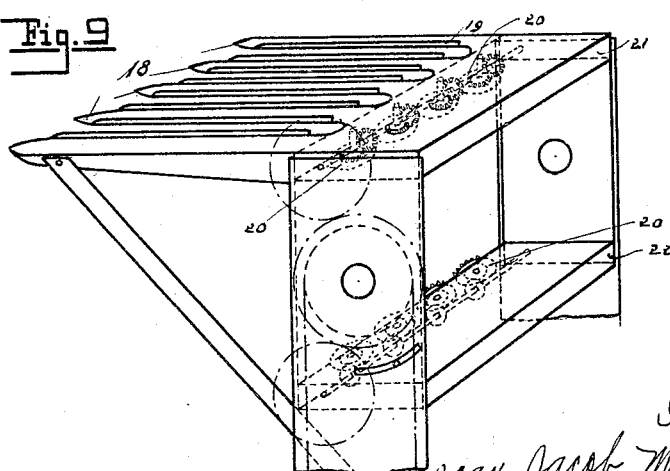

Patented Jan. 27, 1931

1,790,204

UNITED STATES PATENT OFFICE

JOAN JACOB MARI ELIAS, OF WASSENAAR, NEAR THE HAGUE, NETHERLANDS

MOTOR-DRIVEN MACHINE FOR HARVESTING SUGAR CANE

Application filed July 12, 1928, Serial No. 292,039, and in the Netherlands July 18, 1927.

The invention relates to a motor-driven machine for harvesting sugar-cane and other plants growing in a similar way.

The object is a machine which can easily be mounted to an existing motor-tractor and then be moved through cane plantations for harvesting the sugar-cane, either the stems only or the stems together with the roots, and which if desired may be provided with a device which at the same time polls the butts of the cane.

Several parts of the machine are illustrated in the accompanying diagrams, in which different constructions are given as examples.

In the diagrams:

Fig. 1 represents a front-view of the machine, showing the way in which its iron-beams are mounted on the axles of a tractor;

Figs. 2 and 3 show two forms of apparatus, which hoe or dig the canes out of the bottom, the former (Fig. 2) for Java and other countries where the plants are extracted from the ground including the roots etc., the latter (Fig. 3) for Cuba or other countries, where the sugar-canes are cut-off horizontally just under the surface of the ground in order to obtain more growths;

Figure 5:
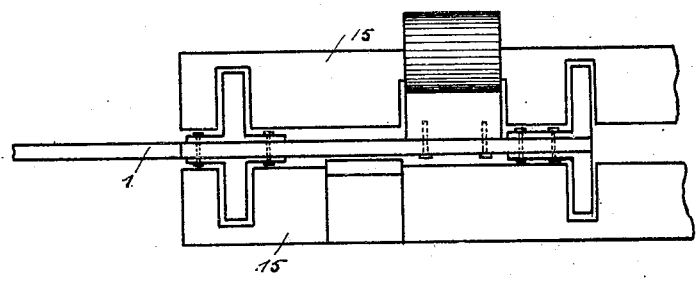

Fig. 5 the way in which both the guiding-walls or cane-lifters are mounted in front of the carriage;

Fig. 6 the way in which the cane-lumps will run over the hoeing-apparatus and guide discs;

Fig. 7 a top-view of the machine;

Fig. 8 a butt-poll-ladder with fingers and the cane-lifter with the vertical saw;

Fig. 9 a box in the top of the ladder in which two sets of horizontal saws are placed.

The machine possesses two guiding-walls 1, which, at the front side end in a peak, and having slanting upper edges which gradually progress backwards and meet, at a definite height a rotary or fixed cutting-instrument 2, from which cutting-instrument the walls gradually progress further upwards.

The cutting-instrument projects so far from the edge of the guiding-wall, that stems, lifted up from the earth already, whilst gliding upwards along the edges, are cut off at a definite height by the above-mentioned cutting-instrument.

Between the aforesaid guiding-walls 1, a harvesting-member is mounted.

This consists of two symmetric parts 3 and 4 (Fig. 2), which are formed by vertically slightly bent, more or less triangulated, coulterknives and which are provided at the inner-side, of sloping guiding-plates 5 to guide the earth lumps that have got to be hoed out. These guiding-plates are mounted detachably.

Figure 4:
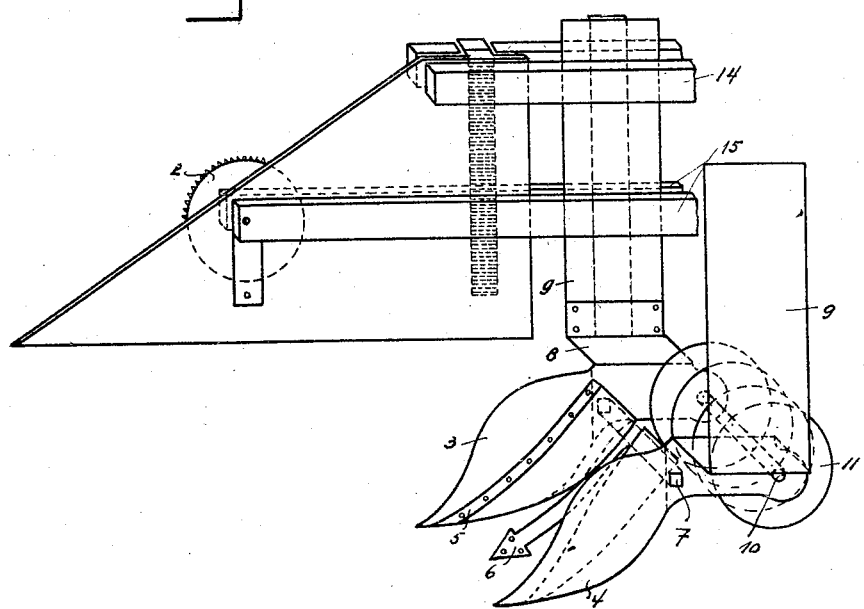
Fig. 4 shows a guiding or cane lifting wall, in combination with the harvesting hoeing-apparatus, mounted on the frame of the carriage.

Furthermore this member possesses a so-called hoeing-rod 6 (Fig. 4), fixed to a horizontal bar 7 which in its turn is fixed to the above-named vertical coulter-knives, by means of screw-bolts, in such a way, that it is situated behind the sloping guiding-plates and exerts no resistance or pressure on the ground.

The coulters, by means of screw-bolts are connected to a member 8, that again is fixed with bolts to the vertical hoeing-frame 9.

According to the invention a second bar or spindle 10, parallel to, but arranged a little higher than the first one, may be mounted in ball-bearings in the vertical coulter-knives behind the first bar.

Between these two spindles, so much room is left, that a number of discs 11 fixed on this bar or spindle, can find ample room.

The intention of these discs, being to crumble away the solid earth lumps which have been hoed out of the ground by the harvesting-member.

The guiding-walls 1 or the so-called cane-lifters, consists of one straight plate, placed in the prolongation of the frame-girders.

The machine, provided with these pointed guiding-plates, will now easily be able to find its way through the inextricable cane, which lies in a mess flat on the ground and generally is grown to same.

It is easily understood, that this plate, of say ½" thickness, when sliding in its working position over the harvesting-field, easily will be able to shuffle with its sharp point under the stems and also to lift the fallen cane-stems and same which may be grown to the ground.

Further according to the invention, the hoeing-apparatus, which serves to extract the plant with its roots etc. from the earth, may be substituted by quite a different cutting-apparatus, consisting of two flat horizontal half-moon-form knives 12 and 13, Fig. 3, of which the sharp edges or cutting-edges progress arcwise from the outside to the inside and by which the plants will be cut horizontally and flat just underneath the surface of the ground. This will particularly be of importance in those countries, where, in order to obtain a second or further growth from the roots, same are left in the ground.

Each of these harvesting-members may be adjusted vertically by means of hand-wheels and are mounted right in front of the engine, i. e. front of the radiator of the engine, in a frame of iron-girders 14, 15, which are fixed to the front- and back-axles of the engine-car, right between the body of the engine and the caterpillars.

The apparatus can easily be arranged in such a way, that it may be fixed to each tractor, so that one, with relative small costs, can build a harvesting-machine, which will serve its purpose.

Since the tractors usually have an axle-height of approximately 30 cm., it will be necessary to increase same to about 40 cm. or more, so that the bottom-clearance will be enlarged, and sufficient room is formed to let all the hoed-out cane-stems, earth-lumps, dry leaves and other vegetation, pass under the waggon and between the caterpillars.

Between the cane-lifters, according to the invention, a sloping-poll-ladder (Figs. 7, 8, 9) may be mounted in front and at some distance of the hoeing-member and between the can-lifters.

The feet of this ladder 16 are fixed swingingly to the frame of iron-beams 15, at the top of the ladder a swinging box-like organ 17 is mounted, the cover of same consists of a horizontal plate cut out in such a way, that long fingers 18 are formed, which are provided at the inner edges of a continuous upright knife 19.

In agreements with the plants, which may have longer or shorter stems, this ladder may be adjusted higher or lower, whilst the fingered plate, which always must remain approximately horizontal also can be moved in its hinges, in order to adjust same.

The intention of this poll-ladder is to bend the upright canes gradually forwards and, by means of two sets of horizontal top-saws 20, to cut-off the tops of the canes.

This can be done, because the cane-stems are guided by these fingers, one after the other, until the tops of the canes come into contact with the saws and are cut-off by same.

These cut-off tops, which are used as sprouts, find their way backwards through the open side at the back of the box and fall on the ground underneath the carriage.

This being done, the hoeing-apparatus extracts the root-lump from the bottom and the canes to fall on the ground underneath the carriage. The swinging-box 17 is fixed at the top of the ladder, and is open at the front and at the back and cover and bottom consists of smaller boxes 21, 22, in which the horizontal saws are mounted, which are driven from a pulley of the engine by means of a chain, which runs along the outside of one of the legs of the ladder. It may be noted, that a pulley is generally present at each tractor in order to drive machines.

Cover-plates for the wheels or caterpillars may be built rigidly against the cane-lifters or they may be fixed to the frame of the caterpillars in which case they will be free from the cane-lifters. The cover-plates can by means of a handle be moved up or down from the driver's seat.

What I claim is:

1. A motor-driven machine for harvesting sugar cane and the like plants, having cutting instruments and also having two guiding walls, the front edges of which are inclined upwardly and rearwardly, said cutting instruments being arranged at a point intermediate the lower and upper sides of said walls and projecting forwardly of said inclined edges, so that said edges serve to guide stalks to said cutting instruments and a harvesting member between said walls and arranged thereabove, said member having forwardly extending fingers spaced apart and cutting devices at the rear ends of the spaces between said fingers.

2. Sugar-cane-harvesting-machine according to claim 1, including a second set of cutting instruments acting in a similar way, which are mounted at the same distance from each other and arranged underneath and at a definite distance from the upper set of cutting instruments.

3. Sugar cane harvesting machine according to claim 1, including a second set of cutting instruments acting in a similar way which are mounted at the same distance from each other and arranged underneath and at a definite distance from the upper set of cutting instruments, said second set of cutting instruments being vertically adjustable.

4. A motor-driven machine for harvesting sugar-cane and other plants growing in a similar way, having two guiding walls, which at the front side end in a peak, said walls having upper cutting edges, a cutting instrument, fixed at a definite height and to which said cutting edges extend and from which cutting instrument the said edges also gradually progress upwardly and rearwardly, the cutting instruments projecting so far from the said edges that the stems lifted by the guiding walls are cut off, and having between these guiding walls a harvesting member, provided with upstanding arm-like members, carrying a number of vertically adjustable horizontal fingers, and which are mounted over, and project in front of the harvesting organ, while at the end of the slots between the fingers, partly covering these slots, horizontal disc-saws or other cutting instruments acting in a similar way are mounted.

5. A motor driven sugar cane harvesting machine as claimed in claim 1, including means enabling the horizontal fingers to be horizontally adjusted.

6. Sugar-cane-harvesting-machine according to claim 1, wherein the harvesting member consist of a hoeing-iron, having a number of vertical revolving discs, which are mounted behind the hoeing-iron, but a little higher and at such a distance from each other, that the cane-lumps, which glide upwards along the hoeing-iron arm, are crushed.

7. Sugar cane harvesting machine according to claim 1, wherein the harvesting member consists of a hoeing iron having a number of vertically revolving discs which are mounted behind the hoeing iron, somewhat higher and at such distance from each other as to cause the cane lumps which glide upward along the hoeing iron arms to be crushed and also including coulter knives at each side of the hoeing iron each consisting of vertical plates large at the back but which finish at the front in a peak and which are slightly bent and at the inner side provided with triangularly shaped guiding plates, the sharper points of which are directed forwardly, and which, with one side, adjoin the coulter knives and with the broad side partly overlap the hoeing iron and are bent to suit the coulter knives.

8. Sugar-cane-harvesting-machine according to claim 1, characterized in that the guiding-walls consist of rigid singular vertical plates, which are adjustable in a vertical direction.

9. Sugar-cane-harvesting-machine according to claim 1, characterized by a harvesting-member consisting of two horizontal knives, placed side by side and adjustable in a vertical direction of which the cutting- or inner-edges, which approximately touch each other with their inner points, progress arc-wise in forward and outward direction.

10. Sugar-cane-harvesting-machine according to claim 1 in which the horizontal fingers and the two sets of horizontal disc-saws are mounted in a box, which is fixed to arms or a frame and made adjustable on a horizontal axle, the arms or the frame being fixed adjustable in vertical direction to the machine.

In testimony whereof, I have signed my name to this specification.

JOAN JACOB MARI ELIAS.